United States Patent
Hantschel et al.

(10) Patent No.: US 11,876,242 B2
(45) Date of Patent: Jan. 16, 2024

(54) MODULE LAYER AND BATTERY SYSTEM MADE THEREFROM

(71) Applicant: ElringKlinger AG, Dettingen/Erms (DE)

(72) Inventors: Jochen Hantschel, Dettingen/Erms (DE); Tobias Schmidt, Dettingen/Erms (DE)

(73) Assignee: ElringKlinger AG, Dettingen/Erms (DE)

( * ) Notice: Subject to any disclaimer, the term of this patent is extended or adjusted under 35 U.S.C. 154(b) by 0 days.

(21) Appl. No.: 17/797,839

(22) PCT Filed: Jan. 30, 2021

(86) PCT No.: PCT/EP2021/052223
§ 371 (c)(1),
(2) Date: Aug. 5, 2022

(87) PCT Pub. No.: WO2021/156160
PCT Pub. Date: Aug. 12, 2021

(65) Prior Publication Data
US 2023/0083540 A1 Mar. 16, 2023

(30) Foreign Application Priority Data
Feb. 7, 2020 (DE) .......................... 102020103230.7

(51) Int. Cl.
*H01M 10/613* (2014.01)
*H01M 10/653* (2014.01)
(Continued)

(52) U.S. Cl.
CPC ......... *H01M 50/26* (2021.01); *H01M 10/613* (2015.04); *H01M 10/653* (2015.04);
(Continued)

(58) Field of Classification Search
CPC .. H01M 50/26; H01M 10/613; H01M 10/653; H01M 10/6551; H01M 50/284;
(Continued)

(56) References Cited

U.S. PATENT DOCUMENTS

| 2007/0012497 | A1 | 1/2007 | Sakurai | |
| 2009/0297892 | A1* | 12/2009 | Ijaz | ...................... H01M 10/643 219/121.64 |
| 2013/0122341 | A1* | 5/2013 | De Paoli | ............. H01M 50/503 429/99 |
| 2013/0216874 | A1 | 8/2013 | Endo et al. | |

(Continued)

FOREIGN PATENT DOCUMENTS

| DE | 102006045564 A1 | 4/2008 |
| DE | 102011101022 A1 | 11/2012 |

(Continued)

*Primary Examiner* — Muhammad S Siddiquee

(57) ABSTRACT

A module layer and to a battery system made therefrom, which, as a device for supplying and storing electrical energy between two final end components, comprises a number of battery modules that are electrically connected to one another in series. Each module here consists of a number of elementary cells, which are generally lithium-ion batteries. The module layer is embodied as a structural unit, wherein the cells in the module layer are positioned next to one another in a tray, in an upright position on a base element of the tray, and are enclosed by an outer frame that is embodied as a heat sink and constitutes the rim of the tray, the outer frame has a seal, and the module layer has a section of a central shaft into which bus bars protrude, which produce a conductive connection with the cells of the respective module layer.

15 Claims, 5 Drawing Sheets

(51) Int. Cl.
*H01M 10/6551* (2014.01)
*H01M 50/26* (2021.01)
*H01M 50/284* (2021.01)
*H01M 50/507* (2021.01)
*H01M 50/528* (2021.01)
*H01M 50/522* (2021.01)
*H01M 50/552* (2021.01)

(52) U.S. Cl.
CPC ..... *H01M 10/6551* (2015.04); *H01M 50/284* (2021.01); *H01M 50/507* (2021.01); *H01M 50/522* (2021.01); *H01M 50/528* (2021.01); *H01M 50/552* (2021.01)

(58) Field of Classification Search
CPC ............ H01M 50/507; H01M 50/522; H01M 50/528; H01M 50/552; H01M 50/119; H01M 50/213; H01M 50/224; H01M 50/502; Y02E 60/10
See application file for complete search history.

(56) References Cited

U.S. PATENT DOCUMENTS

| | | | |
|---|---|---|---|
| 2014/0255748 A1* | 9/2014 | Jan | H01M 50/507 429/158 |
| 2014/0370366 A1* | 12/2014 | Higuchi | H01M 50/553 429/158 |
| 2015/0207127 A1* | 7/2015 | Davis | H01M 50/209 429/90 |
| 2017/0047572 A1* | 2/2017 | Biskup | H01M 10/655 |
| 2018/0138484 A1 | 5/2018 | Choi et al. | |
| 2019/0214694 A1* | 7/2019 | Yang | H01M 50/512 |
| 2021/0036270 A1* | 2/2021 | Motohashi | H01M 10/647 |
| 2023/0108219 A1* | 4/2023 | Jang | H01M 10/425 429/120 |

FOREIGN PATENT DOCUMENTS

| | | |
|---|---|---|
| DE | 102013100545 A1 | 7/2014 |
| EP | 2343752 A2 | 7/2011 |
| EP | 3082174 A1 | 10/2016 |

* cited by examiner

MODULE LAYER AND BATTERY SYSTEM MADE THEREFROM

FIELD OF THE INVENTION

The present invention relates to a module layer and to a battery system made therefrom, which, as a device for supplying and storing electrical energy between two final end components, comprises a number of battery modules that are electrically connected to one another in series. Each module here consists of a number of elementary cells, which are generally lithium-ion batteries.

BACKGROUND OF THE INVENTION

From the prior art, it is known that a battery system of the above-mentioned type is composed of battery modules, which are stacked on top of one another in the form of module layers and are terminated by and mechanically anchored between two external connectors and end components that contain an electronic control unit and circuit breakers, etc. This produces a battery system composed of interconnected module layers in the form of a stack, for example see EP 2 343 752 A2 or DE 10 2013 100 545 A1.

In known battery systems, in which the cells arranged in so-called pack layers between two plate-shaped end components are mechanically clamped to a unit by means of tension bolts, the cells are also positioned so that a series circuit is produced, for example, due to the fact that cells are arranged directly in series, wherein the plus pole of the one cell contacts a cup serving as both an external housing and the minus pole of another cell of a subsequent layer. This arrangement can be selected so that the series circuit extends from the start to the end of the battery system on the one side and on the other side, from the end back to the beginning. This achieves a low-impedance design with two external connectors without a dedicated return conductor, e.g. see EP 3 082 174 A1.

US 2013/0122341 A1 also discloses a design composed of cell packets in layers or tiers, with a different electrical interconnection of the cells to one another.

To construct a stacked battery system, it is necessary to connect the individual battery modules of the layers one after the other in series and to distribute a collected current or total current to the individual parallel-connected battery cells. In addition, both electrical potentials of a complete series circuit of a stacked battery system must be brought together in a high-voltage connection box. The return of the one battery pole should not be carried out on the outside of the housing because before it is conveyed to the outside, circuit-breaking elements must absolutely always be provided and these circuit-breaking elements are preferably provided only in the high-voltage connection box, which is generally a component of one of the end components.

The above-mentioned battery systems do generate high power densities, but for cooling, they are dependent on a circulating flow of an insulating coolant between the cells. In addition, a common trait of all stacked battery systems is the fact that they are mechanically shortened during assembly directly due to the insertion and tightening of the tie rods. For example, this causes a squeezing of seals or a compression of electric spring contacts. In this connection, a layered or stacked design is always produced one layer at a time according to the cited prior art, i.e. construction must take place one layer after another. Modules that are located closer to the bottom must therefore already be wired and are thus no longer accessible, for example in order to perform a mechanical correction.

SUMMARY OF THE INVENTION

The object of the present invention is to create a device of the above-mentioned type while improving the accessibility of individual stacks as well as their cooling.

This problem is solved according to the invention in such a way that a module layer is embodied as a structural unit in which the cells in the module layer are positioned on a base element of a tray and are enclosed by an outer frame of the tray that is embodied as a heat sink, the outer frame of the tray has a seal, and in a central region of the base element, the tray has a section of a central shaft into which bus bars protrude, which produce a conductive connection with the cells of a respective module layer.

Each module layer, as a unit, offers a significant improvement in the accessibility of such individual stacks in comparison to known designs. Individual module layers or stacks can now potentially also be directly replaced as a unit, which has never been possible in this way with known battery systems. A module layer according to the invention therefore also has the property that a heat transmission for extracting heat from the module layer via a base plate into a cooling system is positioned at a rim of a base plate. The task of heat extraction from the cells is performed by a base plate, which in one embodiment of the invention advantageously consists of aluminum, which conveys a dissipated heat of the cells to the rim of the base plate and from there to the walls of the outer frame of the tray, which are embodied as heat sinks. There, the heat is then transmitted, for example, to a coolant. In addition, a section of a central shaft is positioned in a central region of each base plate so that no cells can be provided there. Naturally, cells that are situated in the middle of the base plate otherwise have a comparatively poor heat extraction for the simple reason that they are on average located the greatest distance from the rim and many other heat-generating cells also give off heat along this path. A cooling over a comparatively large area at an outer frame through the further use of a zone that is the hottest improves a cooling or more precisely, heat extraction from all of the cells of a module layer. To improve the heat extraction situation, according to the invention no cells are provided in a central region of the proposed module layer. Instead, electrical connectors are provided in a section of a central shaft. The central shaft that is produced when several module layers are stacked is embodied by means of its sections for heat extraction from a central region, which are preferably positioned in the middle of each module layer. This shaft is thus advantageously also used for an additional heat extraction as well as for the bundling of other lines or more precisely, signal and/or control lines.

According to a modification of the invention, the section of the central shaft is provided around an opening in the base element. In this case, the section, as a die-cast part made of a plastic or aluminum, is anchored in position. For example, the section is embodied as a rectangular or cylindrical hollow body, which is fixed in detent fashion in or around the opening in the base element or is embodied of one piece with the tray as an element in the base element.

A battery system, which, as a device for supplying and storing electrical energy between two final end components, has a plurality of module layers of the above-mentioned type, also constitutes an advantageous solution to the above-mentioned problem. The battery system is embodied as a stack of uniform module layers in a direction parallel to the longitudinal axis of the cells, wherein a seal on a frame of a module layer is positioned in an electrically insulating, sealed way against a base element of a respectively adjacent module layer, each module layer has a section of a central shaft into which bus bars protrude, which produce a conductive connection with the cells of the respective module layer in order to form bus bars extending through all of the module layers to two outer contact poles of the battery system.

Advantageous modifications are the subject of the respective dependent claims. Accordingly the individual modules are embodied as prefabricated units in which the battery cells inserted into the tray are anchored to the base element by means of a casting compound. This achieves a unit that is compact and intrinsically very rugged mechanically, which, in the course of being mechanically anchored, is closed in a sealed and electrically insulating way at its open top side by a base element of a subsequent module layer or by an end component.

In a particularly advantageous modification of the invention, the section of a central shaft of each module layer is embodied as a segment or section. The segment that is formed in this way is intrinsically partitioned into separate spaces, with these spaces being separate from one another over almost the entire height of the section in order, for example, to enable an insertion of bus bars. Consequently, each module layer is embodied so that a central shaft of a stack of module layers is partitioned into sub-shafts. In this way, sub-bus bars and return conductors among other things are separated from one another through all of the sections as the respective contents of these sub-shafts and are thus to a certain extent also protected from one another both electrically and mechanically, as is shown in greater detail in the drawings of an exemplary embodiment.

The central shaft advantageously has at least two separate segments. In a spatially separate way, these segments accommodate the bus bars extending through all of the module layers to at least the two outer contact poles of the battery system. In the central region of each module layer that is the hardest to extract heat from, now bus bars protrude into a section that is conductively connected to the cells of the respective module layer. As a result, sections of a plurality of module layers that are stacked successively on top of one another then form a central shaft through which bus bars extending through all of the module layers form a conductive connection to two outer contact poles of the battery system. In addition to the possibility of an additional heat extraction right in the center of each module layer with an electrical and mechanical separation, among other things, of sub-bus bars and bus bars, a central shaft also offers sufficient space to compensate for mechanically or thermally induced length changes of seals, frames, and/or electrical conductors.

In a particularly advantageous modification of the invention, the section of the central shaft has anchoring or detent-engaging openings for the bus bars. The bus bars are connected via contact points to a network for interconnecting the elementary cells of the module layer in question. Temperature differences and also vibrations could transmit a force from the cells to the bus bars. The detent-engaging or anchoring connections in the section of the central shaft counteract this functioning like a strain relief. As a result, no additional mechanical strain is introduced into the whole central shaft.

The openings are advantageously embodied in such a way that a length compensation of the bus bars is possible only in a direction parallel to the longitudinal axis of the cells. A compensation along a longitudinal axis is thus possible while avoiding the presence of loose parts inside the above-described structure.

Preferably, the cells in a module layer are electrically connected to one another in series subcircuits and/or parallel subcircuits via a contact board. For each polarity, the contact board is electrically connected to a bus bar via a terminal strip. In one advantageous modification of the invention, the terminal strips are positioned along opposite outer edges of the contact board from each other, the terminal strips themselves being embodied in comb-like fashion in order to provide a plurality of connectors for metal conductors into or out of the contact board.

In a significant modification of the invention, at least one sub-bus bar is provided as an electrical connection between adjacent module layers in a battery system. A sub-bus bar of this kind has an approximately S-shaped curve. At its free ends, each sub-bus bar is embodied to be contacted with ends of the bus bars, which protrude into the section of the central shaft. Form-fitting, non-positive, and/or integrally bonded connections are selectively provided for this purpose. An electrical connection by means of a crimping or screwing is particularly preferable here.

In one embodiment of the invention, the bus bars are produced as stamped and bent parts made of aluminum or copper. In a modification of the invention, these metal parts are coated with an electrically insulating layer outside of the end regions that are embodied for a form-fitting, non-positive, and/or integrally bonded connection. This insulation is preferably embodied in the form of a coating or as a piece of tubing.

What has been described above is thus a battery system constructed of module layers embodied as individual units, which is not dependent on a circulating flow around each individual battery cell for the heat extraction, and includes a possibility for electrical connections to absorb or compensate for the changes in the paths and distances that occur between the modules during stacking due to a distortion of seals among other things and for these electrical connections to receive a branch current from each of the parallel cell circuits of a module layer and distribute it in an inexpensive, low-loss, and light-weight way to the first parallel cell circuit level of the next module layer. In this connection, the module layers are preferably always embodied identically. In order to eliminate a basic disadvantage in a central heat extraction from cells positioned in the middle of a respective stack, according to the invention, no cells at all are placed there. Instead, this central region is selected as the location for placement of the electrical series circuit elements of the module layers for a respective section of a central shaft. A base plate of the module tray has a cut-out in this region. An approximately cylindrical or column-like section with a rectangular cross-section, which is preferably made of plastic or of a die-cast aluminum provided with electrical insulation, is inserted into the opening in the base element.

A current collecting/distributing structure of a plus and minus pole of each module is guided to a corresponding section of this part of the central shaft. At least one of the guiding bus bars is embodied in such a way that when the module is mounted on top of the underlying module, it can be electrically connected directly or indirectly via an additional bus bar element to the respective module beneath it and forms an electrical series circuit. This at least one bus bar is also embodied so that by elastically deforming, it is able to absorb the changes in path or length between the modules for example in the range of approx. 2 mm that occur when the modules are clamped to the stacked battery system. To that end, the required room is provided in a head region of the cells of the module layers and the position of each bus bar is anchored in the other spatial axes by means of a plastic component.

In order to produce the current distribution to the cells of a module layer in a space-saving and weight-saving way, current-distributing rails that extend toward the central shaft are placed at the ends of the bus bars facing the cells and are preferably made of a an aluminum extruded profile that is cut to length. Advantageously, through the selection of a module-specific extruded profile, the inner contour of the module wall can be ideally modeled and the current-distributing rail can be made to conform to the shape of this inner contour. This achieves a particularly space-saving option, which is also inexpensive in comparison to copper rails, for distributing the current to the cells. At the same time, through a conforming to a module housing inner wall of the frame of the module tray behind which water circulates, it is possible to insure that a good heat extraction from the current-distributing rail is achieved. A resistance coefficient of aluminum, particularly in various extrusion alloys, that is somewhat higher in comparison to copper is thus inconsequential in relation to the losses. Since an inner wall of a multiple-casing frame can be made of plastic, there are also no problems in this embodiment with regard to embodying insulation distances, as is usually the case with metallic module housings. The bus bars extending to the central shaft are preferably also made of aluminum for corrosion protection reasons.

A plastic or aluminum part of the central shaft section forms a plurality of ducts. When module layers are stacked on top of one another, one of these ducts constitutes a hollow cavity extending through all of the module layers for accommodating an aluminum or copper bus bar that extends all the way through. This bus bar forms the return of the current from the rearmost module to a high-voltage connection box. This continuous bus bar is mechanically anchored with separate spacer elements, but preferably with an S-shaped wavy embodiment of the bus bar itself such that it presses against the wall in the continuous hollow cavity and thus anchors itself in the hollow cavity.

The central shaft, as the sum of the adjacent sections, is advantageously embodied for extracting heat from a central region of each module layer. In order to better extract heat from the central region of the module layers and from conductors that are loaded with high current flows, the central shaft is used to extract heat from this central region in a better way, preferably by means of active ventilation with the aid of an active air circulation between the high-voltage connection box module that has a coolant distributor and a terminating pressure plate positioned on the opposite side. This reduces temperature differences between the cells and dissipated heat can also be radiated from inside toward the outside.

BRIEF DESCRIPTION OF THE DRAWINGS

Other features and advantages of embodiments according to the invention are explained in greater detail below with reference to exemplary embodiments based on the drawings. The drawings schematically depict the following:

FIG. 5b: shows a cross-sectional view in a plane A-A from FIG. 5a;

DETAILED DESCRIPTION OF THE PREFERRED EMBODIMENTS

Figure 1:
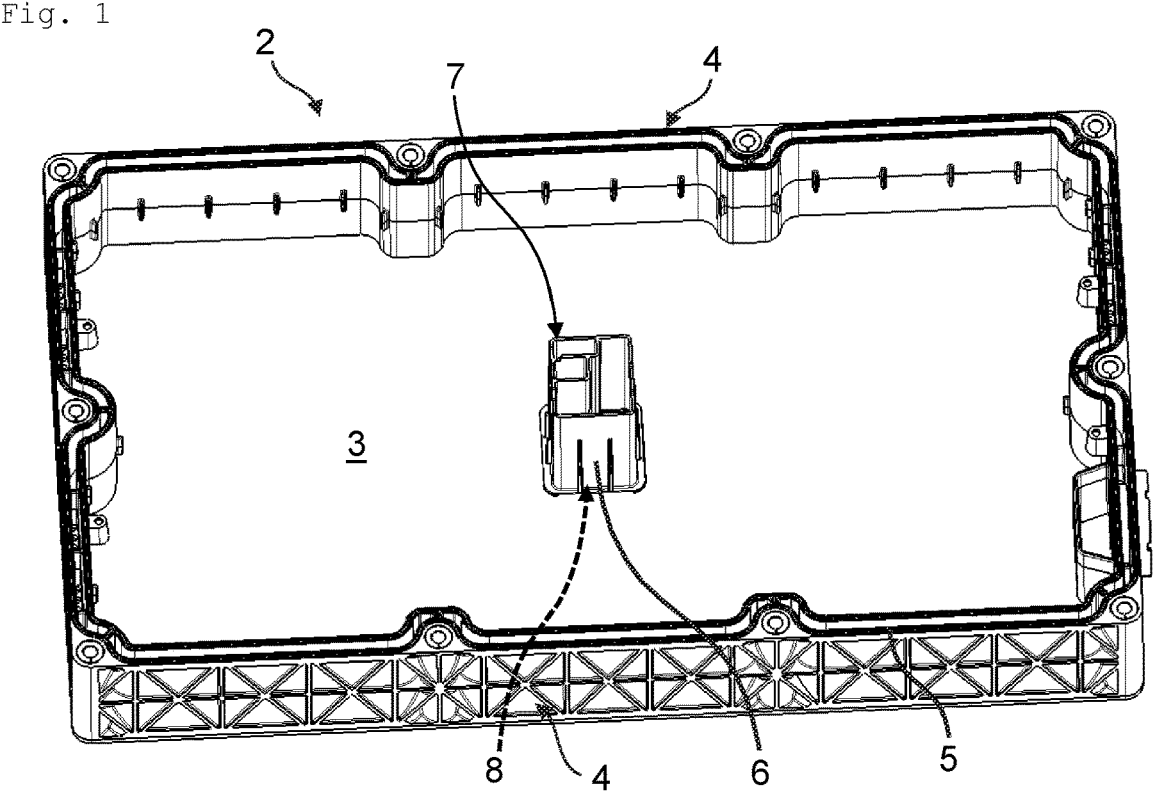
FIG. 1: shows a perspective view of a tray with a base element and an outer frame that adjoins a rim and terminates in an end seal, wherein the base element has a section of a central shaft around an opening.

The same reference numerals are used for the same elements or process steps consistently throughout the various images in the drawings. Without limiting the invention, a flat module layer in the form of a block-shaped body is presented and described below only for an implementation of exemplary embodiments of the invention for use in a battery module with cylindrical cells that is designed for electrically powered vehicles. For the person skilled in the art, however, it is self-evident that in the same way, it is also possible for there to be adaptations to other three-dimensional shapes in which flat module layers are replaced with curved ones in order to make better use of an existing space. In addition, the individual cells do not absolutely have to be in an upright position nor do they all have to be positioned next to one another.

A progressive construction of a module layer 1 is described below in order to illustrate the advantages of a battery system according to the invention. For this purpose, FIG. 1 presents a perspective view of a tray 2 with a base element 3 and an outer frame 4 that adjoins a rim of the base element 3. The frame 4 has a dual-casing or double-walled construction and terminates in an end seal 5. In a central region, the base element 3 also has a section 6 of a central shaft 7, which is provided centrally in the base element 3 of the tray 2, surrounding an opening 8. In this exemplary embodiment, all of the components of the tray 2 are embodied of one piece in the form of an injection-molded part.

Figure 2:
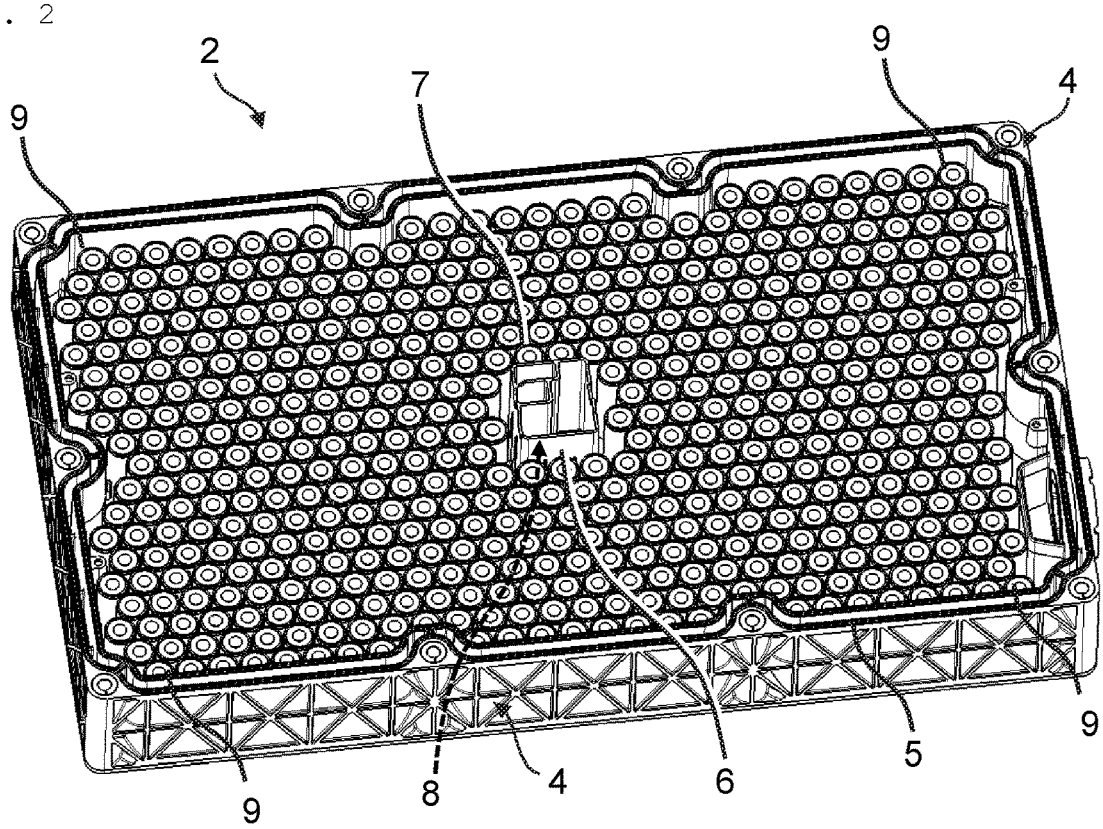
FIG. 2: shows a view according to FIG. 1 of the tray filled with elementary cells that are oriented parallel to one another and are in an upright position.

FIG. 2 shows the view according to FIG. 1 of the tray 2 filled with elementary cells 9 that are oriented parallel to one another. Usually a lithium-ion technology is used for the design of such cylindrical cells 9. In a way that is not graphically depicted in greater detail, the individual cells 9 that are loosely inserted into the tray 2 are anchored to one another and to the base element 3 by means of a casting compound. On the one hand, this anchoring prepares the embodiment of a module layer 1 as a mechanical and structural unit, but it also produces a good thermal coupling of the individual cells 9 to one another and primarily to the plate-like base element 3 for purposes of heat extraction. The base element 3 is particularly important for the heat extraction from the cells 9 and for this reason is composed, for example, of aluminum. The base element 3 conducts the heat dissipated by the cells 9 to the rim of the base element 3 and into the outer frame 4. As a closed outer wall of the tray 2, the frame 4 constitutes a heat sink, which, when the completely assembled battery system is in use, releases dissipated heat to a coolant in a manner that is not shown in greater detail. This outer wall can also be embodied as a double wall if need be.

Figure 3:
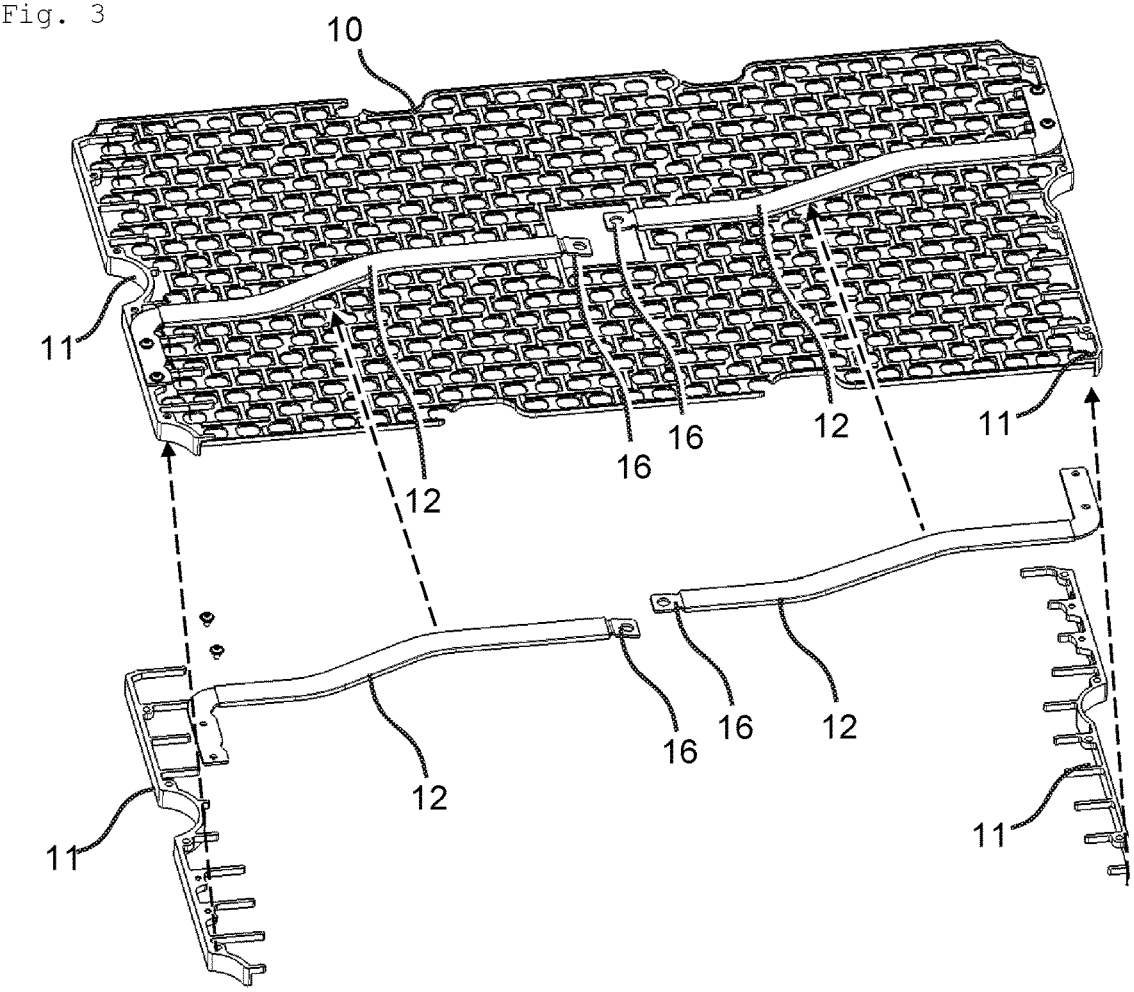
FIG. 3: shows a perspective view of an assembly of a contact board with terminal strips and bus bars.

FIG. 3 is a perspective view of an assembly of a contact board 10 with terminal strips 11 and bus bars 12 for both polarities by means of screws. This step constitutes a completion of the interconnection of the individual cells 9 to one another by means of which the cells 9 are electrically connected to one another in series subcircuits and parallel subcircuits via the contact board 10.

For each polarity, the contact board 10 is electrically connected to a bus bar 12 via a terminal strip 11 in order, with a battery system composed of a plurality of module layers 1, to achieve a required current level and a predetermined voltage with sufficient capacity for use in a car or truck. A total current of the battery system that is not shown in greater detail here must therefore be distributed to the individual cells 9 of the module layers 1 through a network of different conductor sections and must also be gathered back together, so to speak, in order to be transmitted in a high-voltage connection box to a corresponding vehicle. The terminal strips 11 in this case are positioned along opposite outer edges of the contact board 10 from each other and are embodied in comb-like fashion for connection to metal conductors on the contact board 10 that are not shown in detail.

Figure 4:
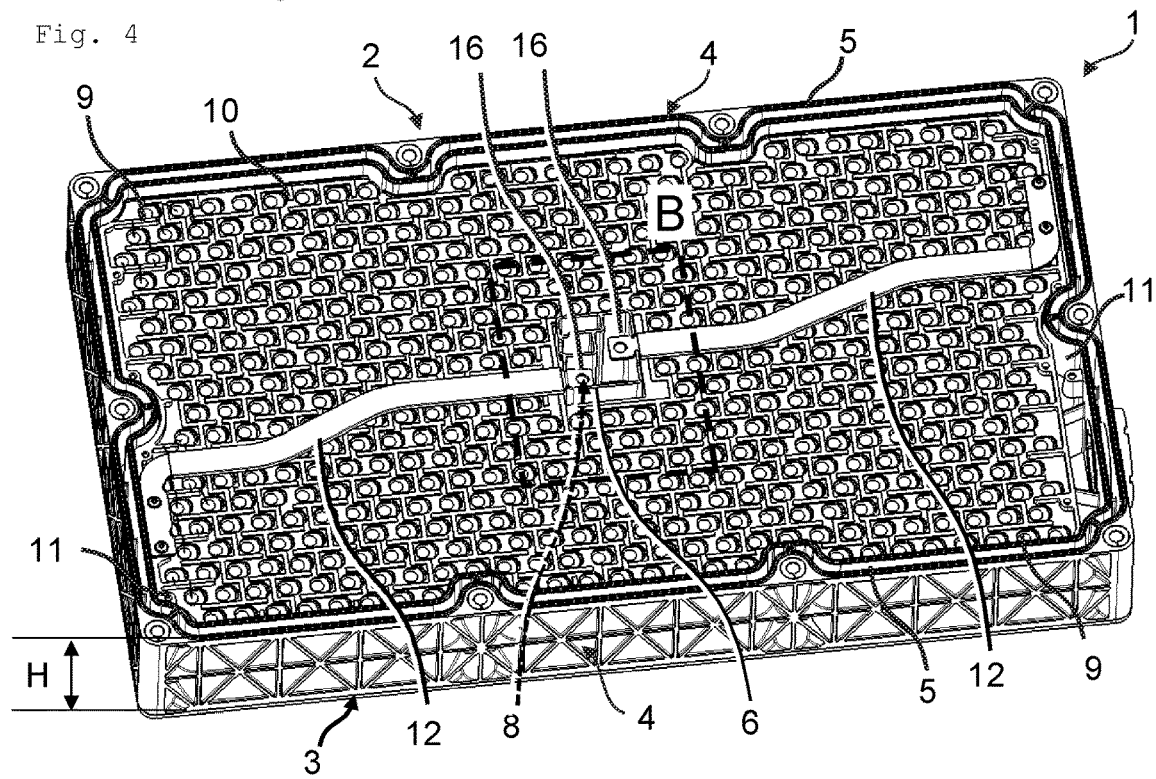
FIG. 4: shows a perspective view of a completely assembled module layer.

In the perspective view of the above-described figures, FIG. 4 shows the completely assembled module layer 1. For this purpose, the arrangement for the interconnection of the cells 9 all the way to the bus bars 12 described in connection with FIG. 3 was placed on and anchored to the cells 9 that are anchored in the tray 2. Due to a heating that is caused by electrical losses of the cells 9, a central region in the tray 3 would always be at a maximum temperature. It is therefore very advantageous to not position any cells 9 right in this central region, but instead to provide well-protected means for providing an electrical interconnection through various module layers 1 within a compact overall structure. The section 6 of the central shaft 7 is provided for this purpose.

Figure 5A:
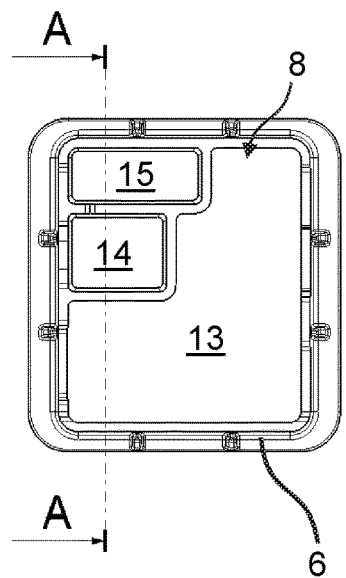
FIG. 5a: shows a top view of a section of a central shaft according to FIGS. 1, 2, and 4
Figure 5B:
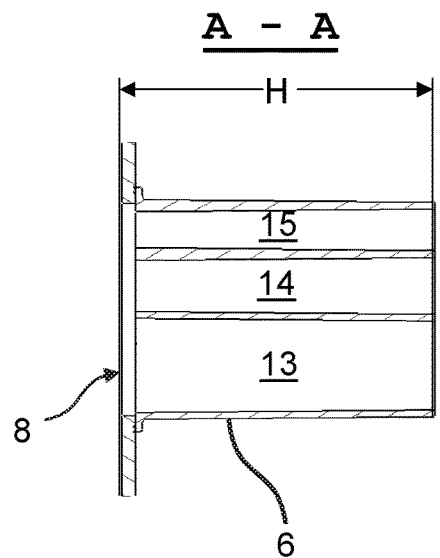

FIG. 5a is a top view of a part of the section 6 of the central shaft 7 that is to be formed over a plurality of module layers 1, as shown in FIGS. 1, 2, and 4. This section 6 is produced as an injection-molded part made of an electrically insulating plastic, is inserted into a central opening 8 of the base element 3, and is anchored in detent fashion at the same time. This section 6, which is embodied here with an approximately square footprint, is embodied as segmented and therefore has spaces 13, 14, 15 that are separate from one another over almost the entire height H of the section 6 for the purposes explained in greater detail below, see FIG. 5b with a cross-sectional view in a plane A-A from FIG. 5a.

Figure 6A:
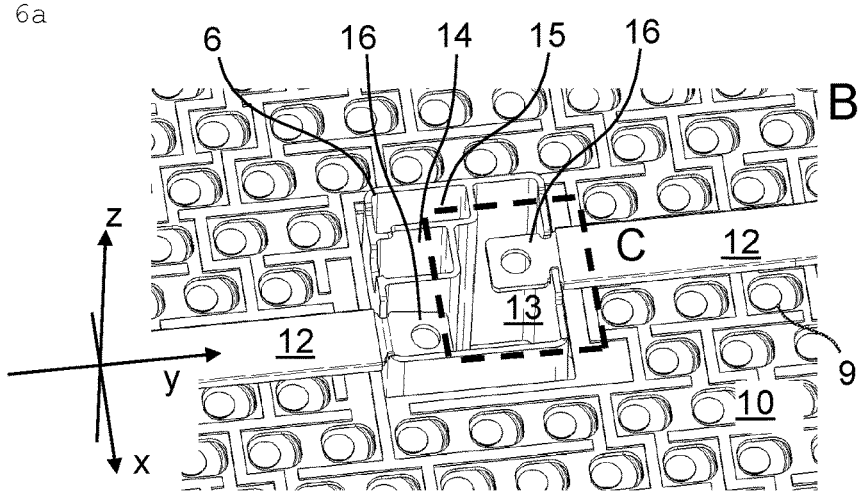
FIGS. 6a to 6c: show a perspective view and a top view of a detail B from FIG. 4.
Figure 6B:
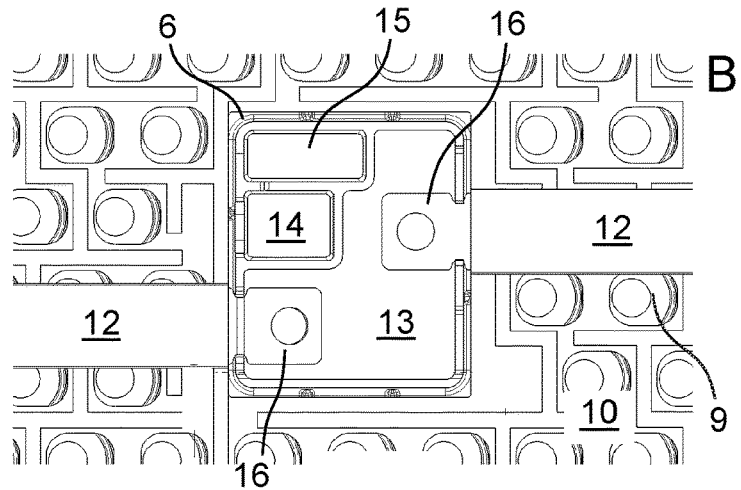
Figure 6C:
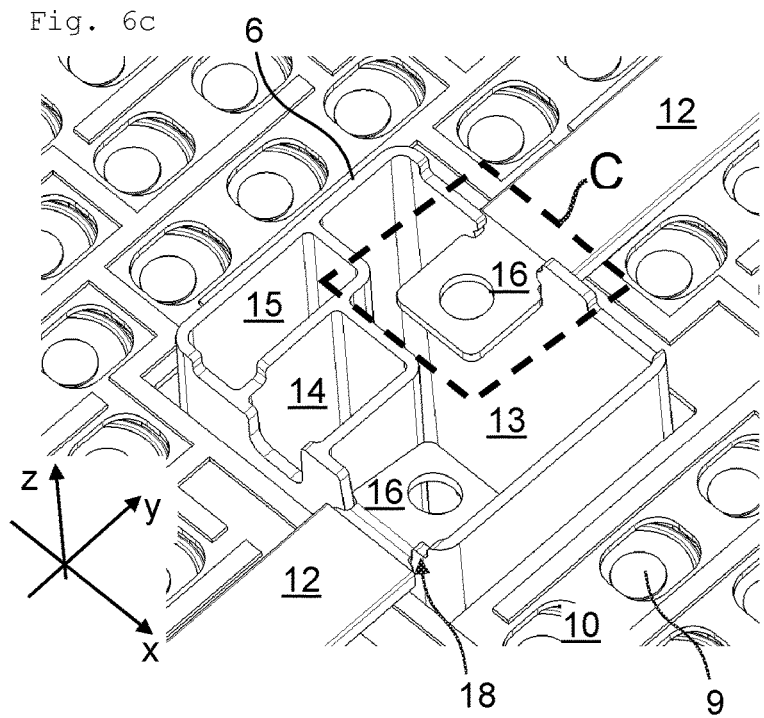

FIGS. 6a to 6c are perspective views and a top view of a detail B from FIG. 4 based on which the different purposes of the spaces 13, 14, 15 inside the section 6 will now be explained. In its section 6 with the spaces 13, 14, 15, the central shaft 7 has separate segments in which after this, bus bars are provided, which are positioned extending through all of the module layers 1 to two outer contact poles of the battery system. To that end, the spaces 14, 15 are embodied as block-shaped while the space 13 has an approximately L-shaped cross-sectional area into which free ends 16 of the bus bars 12 protrude. These free ends 16 of the bus bars 12 respectively serving as inflow and outflow are positioned offset from each other and after assembly of a battery system composed of a plurality of module layers 1, each produce an electrical connection, the one with a subsequent module layer 1 and the other with a preceding module layer 1.

The section 6 of a central shaft 7 has detent anchoring openings 17 for the bus bars 12 in the region of the space 13. In this case, the openings 17 are embodied in such a way that a length compensation of the bus bars 12 is possible in only a direction of a z-axis of a Cartesian coordinate system parallel to the longitudinal axis of the cells 9. Accordingly, the free ends 16 of the bus bars 12 are also able to move only in the z direction in the space 13 of the section 6. The openings 17 have spring-elastic detent projections that engage in recesses 18 at the free ends 16 of the bus bars 12.

Figure 6E:
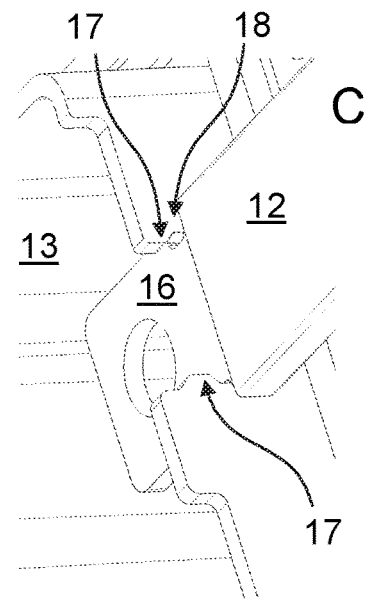
FIG. 6e: shows a perspective view of the detail C from FIG. 6d.
Figure 6D:
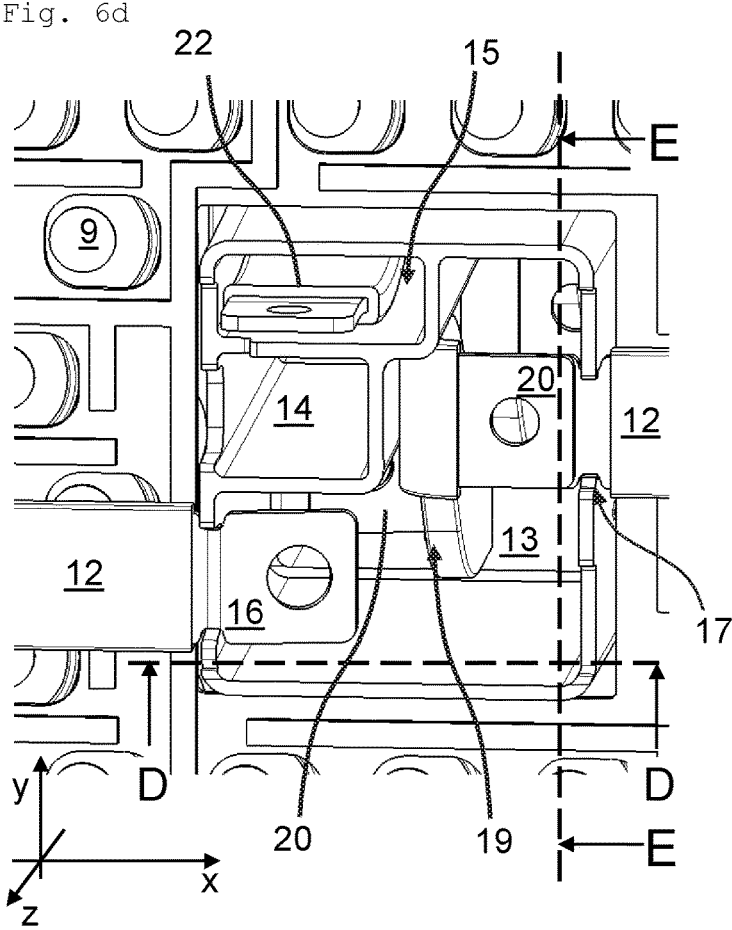
FIG. 6d: shows a perspective view of the detail B from FIG. 4 with inserted sub-bus bars.

FIG. 6d is a perspective view of the detail B from FIG. 4 with inserted sub-bus bars 19. These sub-bus bars 19 have an S-shaped curve in a plurality of planes, with bent end regions 20 for contacting with the free ends 16 of the bus bars 12 of the module layer 1 in question that are anchored in the section 6. With reference to the indicated Cartesian coordinate system, a sub-bus bar 19 has an approximately S-shaped curve in an xy-plane, an xz-plane, and a yz-plane. Thanks to this curve, good use is made of the space available inside the L-shaped space 13 with an optimal length compensation of the sub-bus bars 19. Between two connection regions in the end regions 20, the sub-bus bar 19 is encased in an electrical insulation 21, which is also true of the bus bars 12 between their respective connecting regions.

FIG. 6e shows a perspective view of the detail C from FIG. 6c. In this enlarged detail, it is evident how the free end 16 of the bus bar 12, by means of recesses 18 close to the free end 16, is arranged so that it is anchored in detent fashion in the xy-plane in an opening 17 in the space 13 of the section 6 and is able to move over a defined range in the z direction. The bus bar 12 is therefore able to follow along with tolerances in the z direction and also thermal expansions or contractions in a compensating fashion.

Figure 6F:
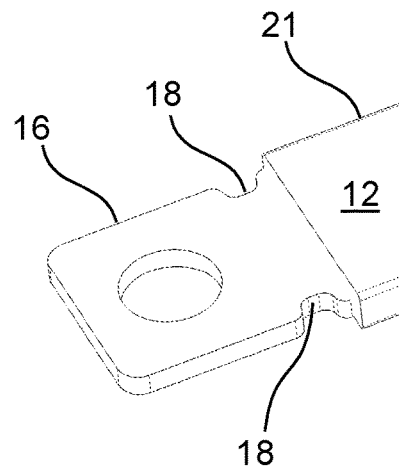
FIG. 6f: shows a perspective view of a connector of a sub-bus bar.

FIG. 6f is a perspective view of a connector of the sub-bus bar 19 from FIG. 6e. From a section encased by an electrical insulator 21, the sub-bus bar 19 tapers to an end by means of notch-shaped recesses 18 at the free end 16.

Figure 7A:
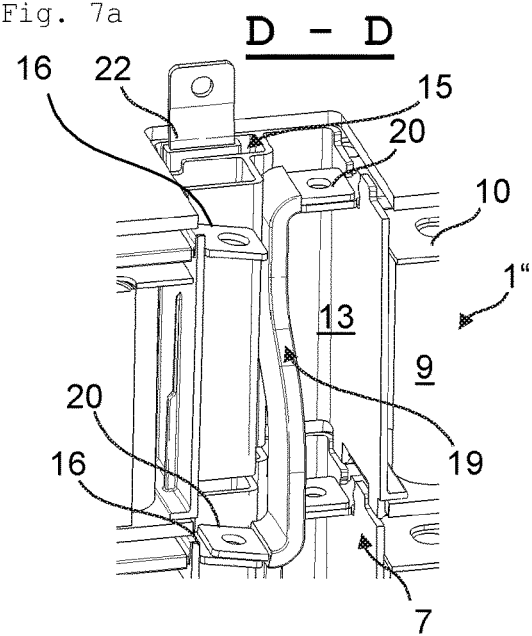
FIGS. 7a and 7b: show perspective views in a plane D-D from FIG. 6d with an inserted and connected sub-bus bar.
Figure 7B:
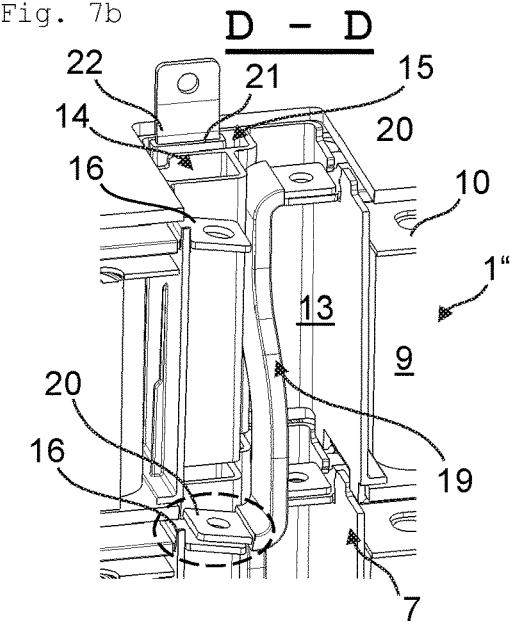

FIGS. 7a and 7b show perspective views in a plane D-D from FIG. 6d with a sub-bus bar 19 that has only been inserted and, with it electrically connected, then a connection of a sub-bus bar 19 between two free ends 16 of bus bars 12 of two module layers 1 stacked one after the other in the z direction. In the region indicated with dashed lines, FIG. 7b shows an initial situation, FIG. 7a a final position of the components that are anchored to one another. A permanent connection that has a sufficiently good electrical conductivity is produced here by means of a stamping of the respective end regions 16, 20.

Figure 8:
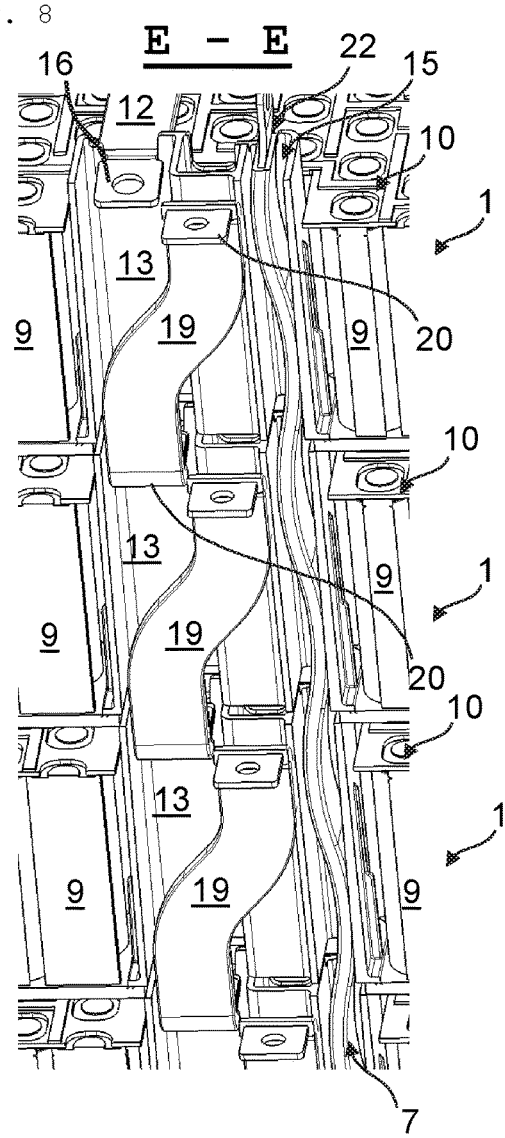
FIG. 8: shows a perspective depiction of a sectional plane E-E extending through three module layers

FIG. 8 shows a perspective depiction in a sectional plane E-E of sub-bus bars 19 and a section of the return bus bar 22 extending through three module layers 1. In this case, the sub-bus bars 19 and the sections of the return bus bars 22 are respectively guided in the spaces 13 and 15 of the central shaft 7 over three sections 6 of the module layers 1. The above-described wavy shape is also used for anchoring the bus bars 19, 22 in the corresponding spaces 13, 15.

Whereas after assembly and plated-through interconnection, the spaces 13 and 15 are occupied by bus bars, the space 14 remains free to accommodate electrical control and/or signal lines for controlling subsystems, not shown in detail, of the respective module layers 1, see FIG. 7*b*. In addition, the whole central shaft 7 is used for an additional heat extraction in the region of the above-described arrangement, which usually has the highest temperatures during operation.

Figure 9:
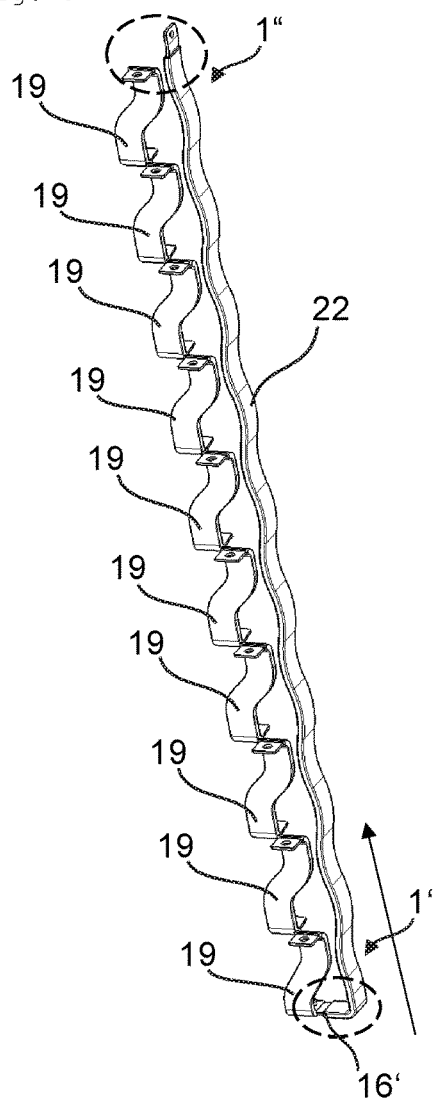
FIG. 9: shows a perspective depiction of sub-bus bars and a return bus bar extending through 10 module layers.

And finally, FIG. 9 is a perspective depiction of sub-bus bars 19 and of a one-piece return bus bar 22 extending through 10 module layers 1 that are not shown in detail. The on the whole wavy curves of the chain of connecting pieces or more precisely sub-bus bars 19 and of the return bus bar 22 serve to compensate for tolerances in production and for temperature expansions. In the z direction, a respective compensation is provided through elastic deformation and through tolerances in the contacting and connection by means of crimping with the sub-bus bars 19 for connection to a final layer. In an assembly of a battery system with 10 module layers 1, at the end, the return bus bar 22 is inserted into the spaces 15 through the central shaft 7 extending through all of the module layers 1 and then is electrically connected at a connector 16' of the bus bar 12 of a bottommost module layer 1'. The topmost module layer 1" then has two connectors emerging from it via which a total current of the 10 series-connected module layers 1 is present, which is 10 times the potential difference of a single module layer 1. This is connected to a high-voltage connection box, not shown in detail, which is usually a component of one of the two end components of the above-described battery system. Other end closures and possibly casings of the battery system and anchoring connections of the module layers 1 are likewise not shown since self-evident and thus known measures in the adaptation to a specific application are left to the discretion of the person skilled in the art.

The image in FIG. 9 also illustrates how comparatively simply, through selection of a corresponding number of uniform module layers 1, a respectively required current level and a predetermined voltage with sufficient capacity for use in a car or truck or for another application can be selected and permanently set. In the end, it is only necessary for the length of the return conductor 22 to be selected in accordance with a respective application and in accordance with the number of module layers 1. All of the other parts are standardized prefabricated modules, though, and remain unchanged by this adaptation. In addition to a free adaptation of electrical parameters within broad limits, this also enables a quick, unproblematic, and reliable replacement of any of the desired module layers within a battery system.

The invention claimed is:

1. A module layer embodied as a structural unit, comprising:
   a plurality of elementary cells, which are electrically connected to one another in series circuits and parallel circuits,
   wherein the cells of the module layer in a tray are positioned on a base element of the tray and are enclosed by an outer frame that is embodied as a heat sink and constitutes a rim of the tray, the outer frame has a seal, and in a central region of the base element, the tray has a section of a central shaft into which bus bars protrude, which produce a conductive connection with the cells of the respective module layer.

2. The module layer according to claim 1, wherein the individual module layers are prefabricated units in which the individual battery cells inserted into the tray are anchored to the base element by a casting compound.

3. The module layer according to claim 1, wherein the base element of the tray consists of aluminum.

4. The module layer according to claim 1, wherein the section is provided around an opening in the base element, and wherein the section, as a die-cast part made of a plastic or aluminum, is anchored in position.

5. The module layer according to claim 1, wherein the section is a segment of a central shaft and has spaces that are separate from one another through almost the entire height of the section.

6. The module layer according to claim 5, wherein the central shaft has separate segments in the form of spaces, which are separate from each other, for the bus bars extending through all of the module layers to two outer contact poles of the battery system.

7. The module layer according to claim 1, wherein the section of a central shaft has anchoring or detent-engaging openings for the bus bars.

8. The module layer according to claim 7, wherein the openings are embodied in such a way that a length compensation of the sub-bus bar and/or bus bar is possible only in a direction parallel to a longitudinal axis of the cells.

9. The module layer according to claim 1, wherein the cells are electrically connected to one another in series subcircuits and/or parallel subcircuits via a contact board and for each polarity, the contact board is electrically connected to a bus bar via a terminal strip.

10. The module layer according to claim 9, wherein the terminal strips are positioned along opposite outer edges of the contact board from each other and are embodied in comb-like fashion.

11. A battery system, which, as a device for supplying and storing electrical energy between two final end components, comprises a plurality of the module layers according to claim 1, wherein the battery system is embodied as a stack of uniform module layers in a direction parallel to the longitudinal axis of the cells,
   wherein a seal on a frame of a module layer is positioned in an electrically insulating, sealed way against a base element of a respectively adjacent module layer, and
   each module layer has a section of a central shaft into which bus bars protrude, which produce a conductive connection with the cells of the respective module layer in order to form bus bars extending through all of the module layers to two outer contact poles of the battery system.

12. The battery system according to claim 11, wherein at least one sub-bus bar or bus bar is provided as an electrical connection between adjacent module layers, which, with an S-shaped curve, is embodied for contacting ends of the bus bars by means of form-fitting, non-positive, and/or integrally bonded connections.

13. The battery system according to claim 12, wherein the bus bars are produced as stamped and bent parts made of aluminum.

14. The battery system according to claim 12, wherein outside of the region that is embodied for a form-fitting, non-positive, and/or integrally bonded connection, the bus bars are provided with an electrical insulation.

15. The battery system according to claim 11, wherein the central shaft, as the sum of the adjacent sections, is embodied for extracting heat from a central region of each module layer.

* * * * *